United States Patent [19]

Holley

[11] Patent Number: 5,008,055
[45] Date of Patent: Apr. 16, 1991

[54] PROCESS FOR PELLETIZING HIGHLY REACTIVE POWDERS

[76] Inventor: Carl A. Holley, 14315 Tall Oaks, Riverview, Mich. 48192

[21] Appl. No.: 577,281

[22] Filed: Sep. 4, 1990

[51] Int. Cl.$^5$ .................... C04B 2/02; C04B 11/28; B29B 9/08
[52] U.S. Cl. .................... 264/117; 23/313 R; 23/313 P; 106/772; 106/775; 106/792; 106/800; 106/801
[58] Field of Search .......... 264/117; 23/313 R, 313 P; 106/772, 775, 792, 800, 801, 697

[56] References Cited

U.S. PATENT DOCUMENTS

| | | | |
|---|---|---|---|
| 2,044,553 | 6/1936 | Welch | 106/800 |
| 2,408,647 | 10/1946 | Huntzicker et al. | 106/800 |
| 2,894,820 | 7/1959 | Rikard et al. | 23/313 R |
| 3,441,511 | 4/1969 | Otrhalek et al. | 23/313 R |
| 3,883,281 | 5/1975 | Holley | 425/222 |
| 4,264,543 | 4/1981 | Valenta | 264/37 |
| 4,726,755 | 2/1988 | Holley | 425/222 |
| 4,744,829 | 5/1988 | Eirich et al. | 106/792 X |
| 4,881,887 | 11/1989 | Holley | 425/222 |

*Primary Examiner*—Mary Lynn Theisen
*Attorney, Agent, or Firm*—William J. Ruano

[57] ABSTRACT

A method for forming strong and durable pellets from dust collected from stack gases. The dust includes $CaSO_3$, $CaSO_4$ and unreacted CaD. A portion of water required for total hydration with the dust is blended in a mixer. The moistened powder is stored in a conditioning container wherein the moistened powder is chemically reacted and heated to form a hydroxide with the oxides in the powder. Water is added to the hydrates and the wetted hydrates are subjected to an intense second mixing. The wetted hydrates are then pelletized in a pelletizer.

8 Claims, 2 Drawing Sheets

PROCESS FOR PELLETIZING HIGHLY REACTIVE POWDERS

More dust is collected from stack gasses of all types and more lime type materials are being utilized to change the sulfur dioxide gas to solid powders. The lime (CaO) reacts with the sulfur dioxide($SO_2$) to form calcium sulfate ($CaSO_3$) and calcium sulfide ($CaSO_4$). Some of the calcium oxide (CaO) and magnesium oxide (MgO) in the lime are not reacted. These materials together with normal fly ash or other furnace emissions are removed from the gas stream by dust collectors which can be either electrostatic precipitators or bag type collectors. This dust is very fine and is extremely hydroscopic.

This type dust may be produced in electric furnaces, rotary kilns, fluid bed combustors and mass burn incinerators or other type incinerators. If this dust is treated in normal ash conditioners or if pellets are produced by adding water in a shallow pan disc equipment, the material will immediately begin to hydrate and as the material hydrates, expansion or enlargement of the particles takes place and the expansion destroys the pellets. The pellets are not only destroyed but also will return to dust which is even finer than the original material.

SUMMARY OF THE INVENTION

It has always been considered impossible to produce strong and durable pellets from this material. I was surprised and wholly unexpected to find that it was possible to blend a portion of the water required for total hydration with the fine powder in a mixer and by storing the moistened powder in a container, it was possible to chemically react all of the water with the powder to form a hydroxide with the oxides in the powder. The mixer should be an intense mixer for best results so that each particle of powder is coated with water. With careful operation, the mixer could be any paddle or ribbon mixer, but a more intense mixer is much more effective. I found that if pellets were produced from this reacted powder, utilizing water as the pelletizing media, the pellets would become very strong and durable as the chemical hydration reaction continues. The pellets can be produced in a shallow pan disc pelletizer, a drum, a tub, or any other type agitative agglomeration device. It was found that because of the very fine nature of the reacted (hydrated) powder, it was possible to produce the best pellets by conditioning the powder in a Ferro Techturbulator such as shown in U.S. Pat. No. 4,881,887 followed by a Ferro-Tech shallow pan disc pelletizer such as shown in U.S. Pat. Nos. 4,726,755 and 3,883,281. "Ferro-Tech" is the trademark of Ferro-Tech Inc. of Wyandotte, Mich.

BRIEF DESCRIPTION OF THE PREFERRED EMBODIMENT

Figure 1:
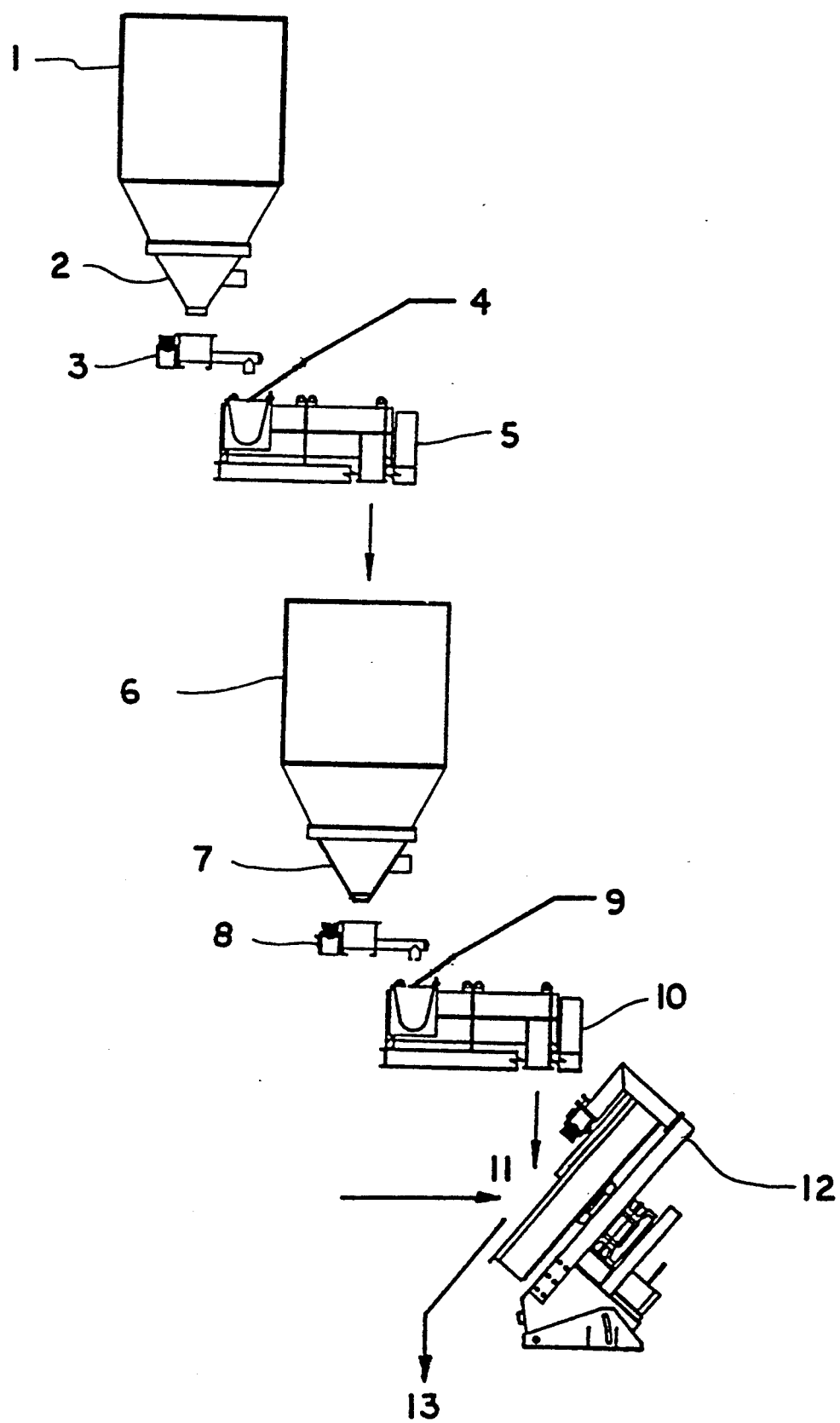
FIG. 1 is a flow diagram of the method embodied in the present invention.

FIG. 1 illustrates one possible process flow diagram of the equipment for utilizing the process of the present invention. The fine reactive powder is fed uniformly from the surge bin 1 through bin discharger 2 and feeder 3 at a fixed rate into water 4 and turbulator 5 at the same time the required proportion of water is added into the turbulator. It has been found that from 5 to 20% water is required. Since the dust composition can vary dramatically, a series of trials was required to determine the actual quantity of water required for partial hydration of each material.

Figure 2:
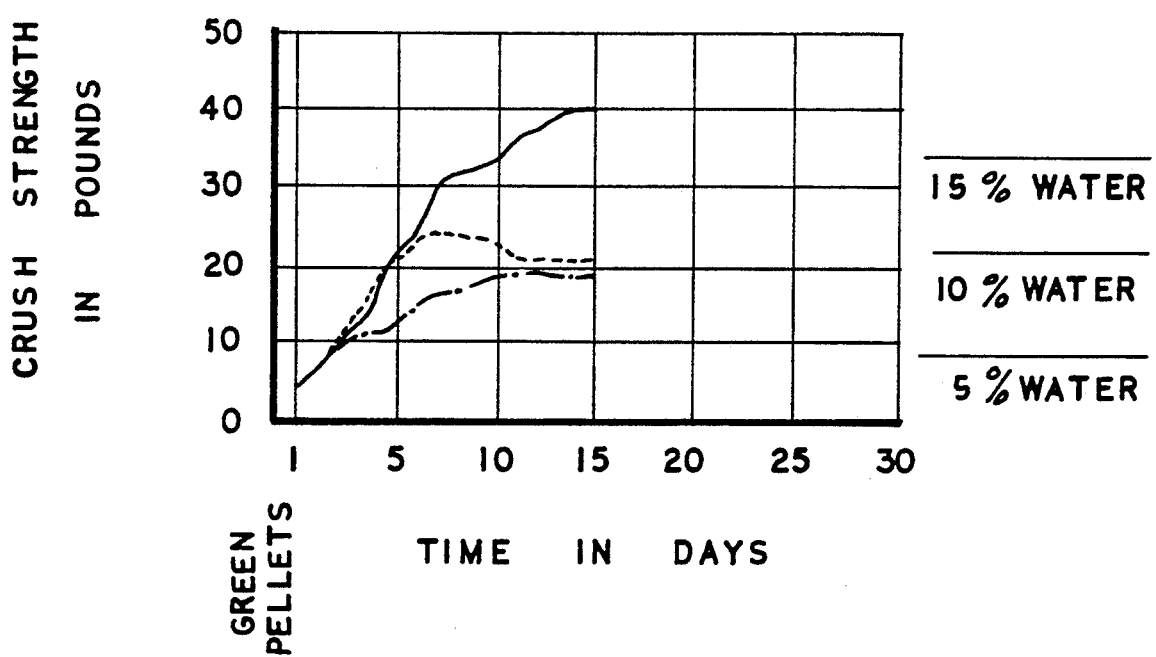
FIG. 2 is a chart of crush strength v time.

FIG. 2 shows the strength curves for a powder when 5, 10 and 15% water was added to partially hydrate the material, it can be seen that there is a difference in crush strength. A Ferro-Tech-turbulator has been found to uniformly coat each particle with water. This uniform coating is important to assure a uniformly wetted powder so that each particle will be partially hydrated, as required. The moistened powder is discharged directly into the conditioning bin 6 wherein hydration takes place. It has been found that with most material, a twenty (20) minute to two (2) hour storage is required to insure that all of the water is chemically hydrated. It is very important for this bin to have mass flow characteristics so that all of the moist blended material is in the bin for the same minimum time. Again, since this is material generated as a waste stream, the composition can vary widely, it is very critical to test the specific material to determine how the partial hydration can be accomplished with this specific material.

Figure 3:
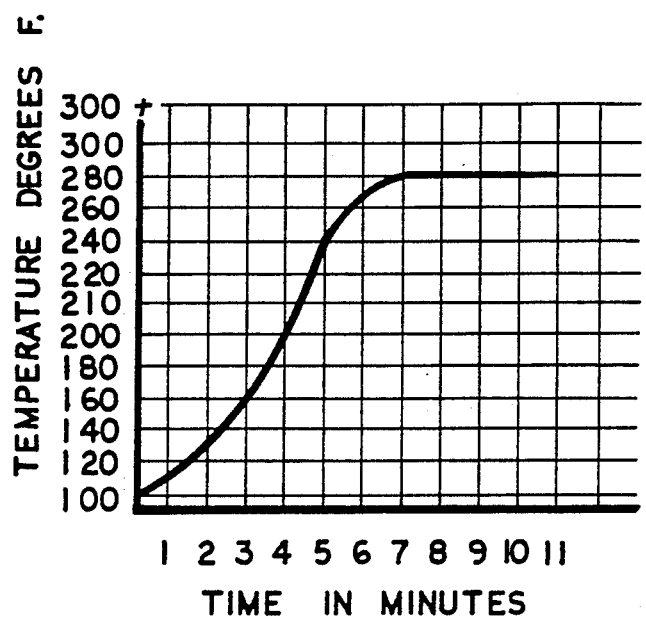
FIG. 3 is a chart of temperature v time.

Once the process begins, the material in the conditioning bin will be heated from the reaction of the material already in the bin and this will cause the reaction to accelerate further. The temperature of the material accelerates rapidly as shown in FIG. 3. Surprisingly, the temperature surpasses 280° F. in seven minutes, as shown in FIG. 3 and the temperatures may reach 400° F. in this same time frame. From bin discharger 7, feeder 8, and water 9 in this order, the conditioned material is withdrawn from the conditioning bin uniformly through a screw feeder and is discharged directly into a second turbulator 10 where a portion of the water 9 required for pelletizing is added. It has been found that the moisture is best added in a high intensity mixer, such as a turbulator, because the powder is now very fine and it is important to coat each particle with water to first cool the particle and then to provide coating water which is required to produce a strong pellet in the disc pelletizer.

The moistened material from the Ferro-Tech turbulator is discharged directly onto a shallow pan disc pelletizer 12, such as described in applicant's prior patent where additional water 11 is added and pellets are produced. The pellets will become hard as the water reacts with the partially hydrated oxides in the pellet and hardening takes place because of the pozzuolanic action. This reaction can take place in a one to two hour period or over a period of two weeks. Pellets are discharged at 13.

One important factor in this process is to add just enough water in the first tubulator to partially hydrate the oxides while still having enough hydration reaction remaining to produce a hard durable pellet.

I claim:

1. The method of forming strong and durable pellets from dust collected from stack gases, the dust including CaSO2, CaSO4 and unreacted CaO, comprising blending a portion of water required for a total hydration with a first mixer, storing the moistened dust in a conditioning container wherein some compounds in the moistened dust are chemically reacted with said water to form hydroxides, adding more water to the reacted dust, subjecting the wetted dust to an intense second mixer, and thereafter pelletizing the wetted dust in a pelletizer.

2. The method recited in claim 1 wherein MgO is included in said stack gases forming Mg(OH)2 when reacted with said water.

3. The method recited in claim 1 wherein water is added to said wetted dust in the pelletizer.

4. The method recited in claim 2 wherein water is added to said wetted dust in the pelletizer.

5. The method recited in claim 1 wherein 5 to 20% total water is added to the dust in said first mixer.

6. The method recited in claim 1 wherein the wetted dust remains between 5 minutes to 2 hours in said conditioning container to insure chemical hydration.

7. The method recited in claim 1 wherein the reacted dust discharged from said conditions container is withdrawn uniformly by a screw feeder and discharged thereby into said second mixer with additional water to condition and uniformly wet the dust before it is discharged to the pelletizer.

8. The method recited in claim 1, wherein only enough water is added to said first mentioned mixer to partially hydrate the compounds in the dust while still having enough hydration reaction remaining to produce hard, durable pellets.

* * * * *